US012581132B2

(12) United States Patent
Yang et al.

(10) Patent No.: US 12,581,132 B2
(45) Date of Patent: Mar. 17, 2026

(54) LARGE-SCALE POINT CLOUD-ORIENTED TWO-DIMENSIONAL REGULARIZED PLANAR PROJECTION AND ENCODING AND DECODING METHOD

(71) Applicant: Honor Device Co., Ltd., Shenzhen (CN)

(72) Inventors: Fuzheng Yang, Shenzhen (CN); Wei Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 347 days.

(21) Appl. No.: 18/270,688

(22) PCT Filed: Feb. 7, 2022

(86) PCT No.: PCT/CN2022/075395
§ 371 (c)(1),
(2) Date: Jun. 30, 2023

(87) PCT Pub. No.: WO2022/166961
PCT Pub. Date: Aug. 11, 2022

(65) Prior Publication Data
US 2024/0298039 A1　Sep. 5, 2024

(30) Foreign Application Priority Data

Feb. 8, 2021　(CN) ......................... 202110172053.1

(51) Int. Cl.
*H04N 19/85* (2014.01)
*H04N 19/103* (2014.01)
(Continued)

(52) U.S. Cl.
CPC ........... *H04N 19/85* (2014.11); *H04N 19/103* (2014.11); *H04N 19/119* (2014.11);
(Continued)

(58) Field of Classification Search
CPC .... H04N 19/85; H04N 19/103; H04N 19/119; H04N 19/136; H04N 19/159;
(Continued)

(56) References Cited

U.S. PATENT DOCUMENTS

| | | | |
|---|---|---|---|
| 7,804,498 | B1 | 9/2010 | Graham et al. |
| 2018/0268517 | A1* | 9/2018 | Coban ................... G06T 15/205 |

(Continued)

FOREIGN PATENT DOCUMENTS

| | | |
|---|---|---|
| CN | 105427239 A | 3/2016 |
| CN | 109509143 A | 3/2019 |

OTHER PUBLICATIONS

Leal E, Sanchez-Torres G, Branch JW. Sparse Regularization-Based Approach for Point Cloud Denoising and Sharp Features Enhancement. Sensors (Basel). Jun. 5, 2020;20(11):3206. doi: 10.3390/s20113206. PMID: 32516976; PMCID: PMC7313689. (Year: 2020).*

(Continued)

*Primary Examiner* — Oneal R Mistry
*Assistant Examiner* — Rachel L Roberts
(74) *Attorney, Agent, or Firm* — Leydig, Voit & Mayer, Ltd.

(57) ABSTRACT

A large-scale point cloud-oriented two-dimensional regularized planar projection method and an encoding and decoding method are disclosed. The two-dimensional regularized planar projection method includes: obtaining original point cloud data; initializing a two-dimensional projection plane structure of a point cloud; and determining a mapping relationship between the original point cloud data and the two-dimensional projection plane structure to obtain a two-dimensional regularized projection plane structure corresponding to the point cloud. The encoding and decoding method includes: predicting based on the two-dimensional regularized projection plane structure of the point cloud to (Continued)

obtain to-be-encoded data; dividing the to-be-encoded data into a first type of to-be-encoded data and a second type of to-be-encoded data; and encoding different data in the first type of to-be-encoded data separately in a preset encoding manner, and correspondingly encoding the second type of to-be-encoded data, to obtain a geometric information bitstream.

16 Claims, 4 Drawing Sheets

(51) Int. Cl.

| | |
|---|---|
| *H04N 19/119* | (2014.01) |
| *H04N 19/136* | (2014.01) |
| *H04N 19/159* | (2014.01) |
| *H04N 19/50* | (2014.01) |
| *H04N 19/70* | (2014.01) |

(52) U.S. Cl.
CPC ......... *H04N 19/136* (2014.11); *H04N 19/159* (2014.11); *H04N 19/50* (2014.11); *H04N 19/70* (2014.11)

(58) Field of Classification Search
CPC ........ H04N 19/50; H04N 19/70; H04N 19/59; H04N 9/3179; H04N 19/42; H04N 19/46; H04N 19/96; G06T 9/001
See application file for complete search history.

(56) References Cited

U.S. PATENT DOCUMENTS

| | | |
|---|---|---|
| 2019/0156520 A1 | 5/2019 | Mammou et al. |
| 2020/0153885 A1* | 5/2020 | Lee ........................ G06T 15/005 |

OTHER PUBLICATIONS

Gao et al., "[G-PCC][New proposal] Predictive Geometry Coding," 128. MPEG Meeting (ISO/IEC JTC1/SC29/WG11), No. m51012, Geneva, CH (Oct. 2019).
Marius Preda, "G-PCC codec description," 132. MPEG Meeting (ISO/IEC JTC 1/SC 29/WG 7), No. N0011 (Dec. 31, 2020).

* cited by examiner

LARGE-SCALE POINT CLOUD-ORIENTED TWO-DIMENSIONAL REGULARIZED PLANAR PROJECTION AND ENCODING AND DECODING METHOD

CROSS-REFERENCE TO RELATED APPLICATIONS

This application is a national stage of International Application No. PCT/CN2022/075395, filed on Feb. 7, 2022, which claims priority to Chinese Patent Application No. 202110172053.1, filed on Feb. 8, 2021, both of which are hereby incorporated by reference in their entireties.

TECHNICAL FIELD

The present disclosure relates to the field of point cloud data processing technologies, and in particular, to a large-scale point cloud-oriented two-dimensional regularized planar projection and an encoding and decoding method.

BACKGROUND

With the improvement of a hardware processing capability and the rapid development of computer vision, a three-dimensional point cloud becomes a new generation of immersive multimedia after audio, image, and video, and is widely used in virtual reality, augmented reality, self-driving, environmental modelling, and the like. However, due to noise, a device jitter, device calibration, and the like, it is presented that large-scale point cloud data is unevenly distributed, which causes difficulties to related data processing and restricts further improvement of encoding efficiency. In addition, a large-scale point cloud generally has a relatively large data volume, which is very unconducive to transmission and storage of point cloud data.

In an existing geometry-based point cloud compression (G-PCC) framework, geometric information and attribute information of a point cloud are separately encoded. Currently, geometric encoding and decoding of the G-PCC may be classified into octree-based geometric encoding and decoding and prediction tree-based geometric encoding and decoding.

For octree-based geometric encoding: first, geometric information of the point cloud is preprocessed, which includes coordinate transformation and voxelization of the point cloud. Then, according to a breadth first traversing order, tree division (octree/quadtree/binary tree) is continuously performed on a bounding box in which the point cloud is located. Finally, a placeholder code of each node and a number of points included in each leaf node are encoded to generate a binary bitstream.

For prediction tree-based geometric encoding: first, an original point cloud is sorted. Then, a prediction tree structure is established. By classifying each node to a laser scanner to which the node belongs, the prediction tree structure is established according to different laser scanners. Next, each node in the prediction tree is traversed, geometric information of the node is predicted by selecting different prediction modes to obtain a prediction residual, and the prediction residual is quantized by using a quantization parameter. Finally, the prediction tree structure, the quantization parameter, the prediction residual of the geometric information of the node, and the like, are encoded to generate a binary bitstream.

However, because the point cloud has relatively strong spatial sparsity, for a point cloud encoding technology using an octree structure, the octree structure will lead to a relatively high ratio of empty nodes obtained through division, and a spatial correlation of the point cloud cannot be fully represented, thereby being unconducive to prediction of the point cloud and entropy coding. A prediction tree-based point cloud encoding and decoding technology uses a part of parameters of a lidar device to establish a tree structure. Based on this, prediction encoding is performed by using the tree structure. However, the tree structure does not fully represent the spatial correlation of the point cloud, thereby being unconducive to the prediction of the point cloud and the entropy coding. Therefore, the foregoing two point cloud encoding and decoding technologies both have a problem that the encoding efficiency is not high enough.

SUMMARY

To resolve the foregoing problem existing in the prior art, the present disclosure provides a large-scale point cloud-oriented two-dimensional regularized planar projection and an encoding and decoding method. The technical problem to be resolved by the present disclosure is implemented by the following technical solutions.

A large-scale point cloud-oriented two-dimensional regularized planar projection method, including:

obtaining original point cloud data;

initializing a two-dimensional projection plane structure of a point cloud by using regularization parameters; and determining a mapping relationship between the original point cloud data and the two-dimensional projection plane structure to obtain a two-dimensional regularized projection plane structure of the point cloud.

In an embodiment of the present disclosure, the regularization parameters include a calibration parameter of a lidar or a parameter obtained through optimized estimation or data fitting.

In an embodiment of the present disclosure, the initializing a two-dimensional projection plane structure of a point cloud by using regularization parameters includes: initializing the two-dimensional projection plane structure of the point cloud by using a number of laser scanners, a sampling angular resolution in a horizontal azimuth, or a number of sampling points of the laser scanner in the regularization parameters, that is, $$M = laserNum; \text{ and}$$

$$N = \frac{360°}{\Delta\varphi} \text{ or } N = pointNumPerLaser,$$

where M and N respectively represent a resolution in a vertical direction and a resolution in a horizontal direction in the two-dimensional projection plane structure, laserNum represents the number of laser scanners, $\Delta\varphi$ represents the sampling angular resolution of the laser scanner in the horizontal azimuth, and pointNumPerLaser represents the number of sampling points of the laser scanner.

In an embodiment of the present disclosure, the determining a mapping relationship between the original point cloud data and the two-dimensional projection plane structure includes:

seeking a solution through the regularization parameters and calibration formulas to obtain a corresponding position of a point in the original point cloud data in the two-dimensional projection plane structure through calculation to determine the mapping relationship between the original point cloud data and the two-dimensional projection plane structure, wherein the calibration formulas are represented as:

$$r = \sqrt{x^2 + y^2};$$

$$i = \arg\min_{i=1\,\ldots\,laserNum} |z - V_o - r \times \tan\theta_o|$$

$$\theta_i = \theta_0;$$

$$x = r \cdot \sin(\phi_j - \alpha) - H_o \cdot \cos(\phi_j - \alpha);$$

$$y = r \cdot \cos(\phi_j - \alpha) + H_o \cdot \sin(\phi_j - \alpha);$$

$$z = r \cdot \tan\theta_i + V_o; \text{ and}$$

$$j = (\phi_j + 180°)/\Delta\varphi,$$

where (x, y z represents Cartesian coordinates of the point in the original point cloud data, r is a cylindrical coordinate component of the point, representing a distance between the point and a coordinate origin of a lidar, laserNum represents a number of laser scanners, $\Delta\varphi$ represents a sampling angular resolution of the laser scanner in a horizontal azimuth, $\theta_i$ and $\phi_j$ are a pitch angle and an azimuth of a corresponding pixel of the point in the two-dimensional projection plane structure, (i, j) represents a position of the corresponding pixel of the point in the two-dimensional projection plane structure, and $\theta_0$, $V_o$, $V_0$, and $\alpha$ are the regularization parameters.

In an embodiment of the present disclosure, the determining a mapping relationship between the original point cloud data and the two-dimensional projection plane structure further includes:

determining a cylindrical coordinate component of a current point in the original point cloud data;

determining a search region of the current point in the two-dimensional projection plane structure;

traversing pixels in the search region, calculating a position of a current pixel in a Cartesian coordinate system, and calculating a spatial distance between the position and the current point;

selecting a pixel with the shortest spatial distance as a corresponding pixel of the current point in the two-dimensional projection plane structure; and repeating the foregoing steps until corresponding pixels in the two-dimensional projection plane structure are found for all points in the original point cloud data.

In an embodiment of the present disclosure, the determining a search region of the current point in the two-dimensional projection plane structure includes:

determining the search region of the current point in the two-dimensional projection plane structure through a pitch angle $\theta$ and an azimuth $\phi$ of the current point in a cylindrical coordinate system; or determining the search region of the current point in the two-dimensional projection plane structure through the regularization parameters and calibration formulas; or determining the search region of the current point according to a-priori information.

In an embodiment of the present disclosure, a calculation formula for the position of the current pixel in the Cartesian coordinate system is:

$$\theta_i = \theta_0;$$

$$\phi_j = -180° + j \times \Delta\varphi;$$

$$r = \sqrt{x^2 + y^2};$$

$$xl = r \cdot \sin(\phi_j - \alpha) - H_o \cdot \cos(\phi_j - \alpha);$$

$$yl = r \cdot \cos(\phi_j - \alpha) + H_o \cdot \sin(\phi_j - \alpha); \text{ and}$$

$$zl = r \cdot \tan\theta_i + V_o,$$

where (i, j) represents a position of the current pixel in the two-dimensional projection plane structure, a pitch angle and an azimuth that correspond to the current pixel are $\theta_i$ and $\phi_j$, $\Delta\varphi$ represents a sampling angular resolution of a laser scanner in a horizontal azimuth, x and y are Cartesian coordinate components of the current point in the original point cloud data, r is a cylindrical coordinate component of the current point in the original point cloud data, (xl, yl, zl) represents the position of the current pixel in the Cartesian coordinate system, and $\theta_0$, $V_o$, $H_o$ and $H_o$ are the regularization parameters.

Another embodiment of the present disclosure provides a large-scale point cloud-oriented encoding method, including:

obtaining original point cloud data and performing a two-dimensional regularized planar projection to obtain a two-dimensional regularized projection plane structure of a point cloud, where the two-dimensional regularized planar projection is implemented by using the method according to any one of claims 1 to 7;

predicting based on the two-dimensional regularized projection plane structure of the point cloud to obtain to-be-encoded data;

dividing the to-be-encoded data into a first type of to-be-encoded data and a second type of to-be-encoded data, where the first type of to-be-encoded data is two-dimensional regularized projection plane structure data, and the second type of to-be-encoded data is remaining to-be-encoded data other than the two-dimensional regularized projection plane structure data; and encoding different data in the first type of to-be-encoded data separately in a preset encoding manner, and encoding the second type of to-be-encoded data, to obtain a geometric information bitstream.

In an embodiment of the present disclosure, the predicting based on the two-dimensional regularized projection plane structure of the point cloud to obtain to-be-encoded data includes:

setting different prediction modes for different data according to the two-dimensional regularized projection plane structure of the point cloud and predicting according to a corresponding prediction mode to obtain the to-be-encoded data.

Still another embodiment of the present disclosure provides a large-scale point cloud-oriented decoding method, including:

obtaining a geometric information bitstream;

decoding the geometric information bitstream to obtain parsed data;

reconstructing a two-dimensional regularized projection plane structure according to the parsed data; and performing geometric reconstruction according to the reconstructed two-dimensional regularized projection plane structure to obtain a reconstructed point cloud.

Beneficial effects of the present disclosure:

1. In the present disclosure, by projecting a point cloud in a three-dimensional space onto a corresponding two-dimensional regularized projection plane structure, regularized correction is performed on the point cloud in a vertical direction and a horizontal direction, and a strong correlation representation of the point cloud on the two-dimensional projection plane structure is obtained, thereby avoiding sparsity existing in a three-dimensional representation structure, and better reflecting a spatial correlation of the point cloud, providing a form of expression that is easier for processing data for an application of the point cloud.

2. In the present disclosure, encoding is performed based on the two-dimensional regularized projection plane structure of the point cloud, which can greatly use the spatial correlation of the point cloud and reduce spatial redundancy, so there is no need to use an additional bitstream to compress other auxiliary information, which reduces the bitstream and improves the encoding efficiency.

The following further describes the present disclosure in detail with reference to accompanying drawings and the embodiments.

DESCRIPTION OF EMBODIMENTS

The present disclosure is further described in detail below with reference to specific embodiments, but implementations of the present disclosure are not limited thereto.

Embodiment 1

Figure 1:
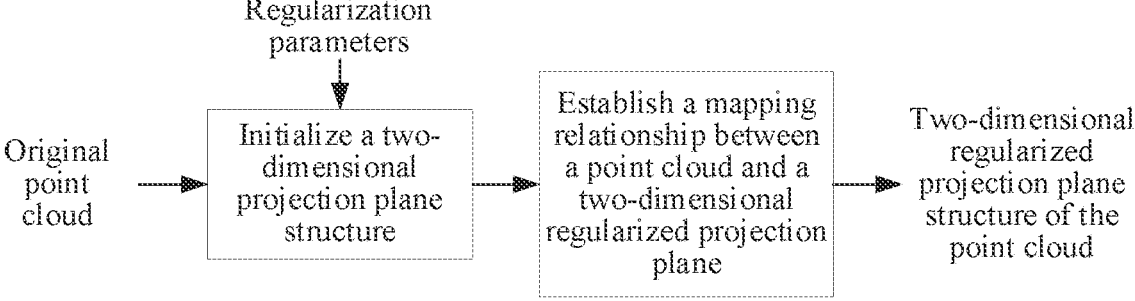
FIG. 1 is a schematic diagram of a large-scale point cloud-oriented two-dimensional regularized planar projection method according to an embodiment of the present disclosure.

Referring to FIG. 1, FIG. 1 is a schematic diagram of a large-scale point cloud-oriented two-dimensional regularized planar projection method according to an embodiment of the present disclosure, including:

Step 1. Obtain original point cloud data.

Specifically, the original point cloud data generally includes a group of three-dimensional space points, and each space point records geometric position information thereof and additional attribute information, such as a color, reflectivity, or a normal. Generally, geometric position information of a point cloud is represented based on a Cartesian coordinate system, that is, represented by using x, y, z coordinates of a point. The original point cloud data may be obtained through scanning of a lidar, or a public data set provided by various platforms. In this embodiment, assuming that geometric position information of the obtained original point cloud data is represented based on the Cartesian coordinate system. It should be noted that, a method for representing the geometric position information of the original point cloud data is not limited to Cartesian coordinates.

Step 2. Initialize a two-dimensional projection plane structure of a point cloud by using regularization parameters.

Specifically, in this embodiment, before a two-dimensional regularized planar projection is performed on an original point cloud, preprocessing, such as coordinate transformation, scale control, or voxelization, may be performed on the original point cloud data to facilitate subsequent encoding.

Initializing the two-dimensional projection plane structure of the point cloud needs to use the regularization parameters. The regularization parameters include a calibration parameter of the lidar or a parameter obtained through optimized estimation or data fitting.

Generally, the calibration parameter of the lidar is finely measured by a manufacturer and provided for a consumer as one of essential data. For example, a collection range of the lidar, a sampling angular resolution $\Delta\varphi$ in a horizontal azimuth or a number of sampling points, a distance correction factor of each laser scanner, offset information $V_o$ and $H_o$ of the laser scanner along a vertical direction and a horizontal direction, or offset information $\theta_0$ and $\alpha$ of the laser scanner along a pitch angle and a horizontal azimuth.

It should be noted that, the regularization parameters are not limited to these calibration parameters of the lidar given above. In a case that the calibration parameter of the lidar is not given, the regularization parameters may further be obtained in a manner such as optimized estimation or data fitting.

A two-dimensional regularized projection plane structure of the point cloud is a data structure including M rows and N columns of pixels. After being projected, points in the original point cloud correspond to the pixels in the data structure. In addition, a pixel (i, j) in the data structure may be related to a cylindrical coordinate component $(\theta, \phi)$. For example, the pixel (i, j) corresponding to cylindrical coordinates $(r, \theta, \phi)$ may be found by using the following formulas.

$$i = \min_{1,2\,\ldots\,LaserNum} |\theta - \theta_0|; \text{ and}$$

$$j = (\phi + 180°)/\Delta\varphi.$$

Figure 2:
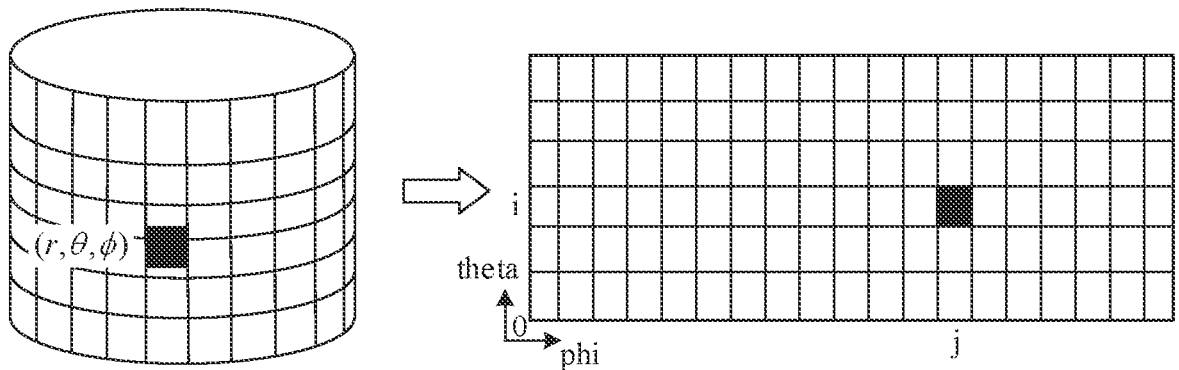
FIG. 2 is a schematic diagram of a correspondence between cylindrical coordinates of a point and a pixel in a two-dimensional projection plane structure according to an embodiment of the present disclosure.

Specifically, referring to FIG. 2, FIG. 2 is a schematic diagram of a correspondence between cylindrical coordinates of a point and a pixel in a two-dimensional projection plane structure according to an embodiment of the present disclosure.

It should be noted that, the correspondence of the pixel herein is not limited to the cylindrical coordinates.

Further, a resolution of a two-dimensional regularized projection plane may be obtained by the regularization parameters. For example, assuming that the resolution of the two-dimensional regularized projection plane is M×N, then a number of laser scanners in the regularization parameters may be used to initialize M, and the sampling angular resolution $\Delta\varphi$ in the horizontal azimuth or a number point-NumPerLaser of sampling points of the laser scanner may be used to initialize N. Specific formulas are as follows, and finally, initialization of the two-dimensional projection plane structure may be completed and a plane structure including M×N pixels may be obtained.

$$M = laserNum;\ and$$

$$N = \frac{360°}{\Delta\varphi}\ or\ N = pointNumPerLaser.$$

Step 3: Determine a mapping relationship between the original point cloud data and the two-dimensional projection plane structure to obtain a two-dimensional regularized projection plane structure of the point cloud.

In this embodiment, a position of the original point cloud in the two-dimensional projection plane structure is determined point by point, and the point cloud originally distributed randomly in the Cartesian coordinate system is mapped onto the evenly distributed two-dimensional regularized projection plane structure. Specifically, for each point in the original point cloud, a corresponding pixel is determined in the two-dimensional projection plane structure. For example, a pixel with the shortest spatial distance from a projection position of a point on a two-dimensional plane may be selected as a corresponding pixel of the point.

In this embodiment, the determining a mapping relationship between the original point cloud data and the two-dimensional projection plane structure includes:

seeking a solution through the regularization parameters and calibration formulas to obtain a corresponding position of a point in the original point cloud data in the two-dimensional projection plane structure through calculation to determine the mapping relationship between the original point cloud data and the two-dimensional projection plane structure, where the calibration formulas are represented as:

$$r = \sqrt{x^2 + y^2}\ ;$$

$$i = \arg\min_{i=1\ ...\ laserNum}|z - V_o - r\times\tan\theta_o|$$

$$\theta_i = \theta_0;$$

$$x = r\cdot\sin(\phi_j - \alpha) - H_o\cdot\cos(\phi_j - \alpha);$$

$$y = r\cdot\cos(\phi_j - \alpha) + H_o\cdot\sin(\phi_j - \alpha);$$

$$z = r\cdot\tan\theta_i + V_o;\ and$$

$$j = (\phi_j + 180°)/\Delta\varphi,$$

where (x, y, z) represents Cartesian coordinates of the point in the original point cloud data, r is a cylindrical coordinate component of the point, representing a distance between the point and a coordinate origin of a lidar, laserNum represents a number of laser scanners, $\Delta\varphi$ represents a sampling angular resolution of the laser scanner in a horizontal azimuth, $\theta_i$ and $\phi_j$ are a pitch angle and an azimuth of a corresponding pixel of the point in the two-dimensional projection plane structure, (i, j) represents a position of the corresponding pixel of the point in the two-dimensional projection plane structure, and $\theta_0$, $V_o$, $H_o$ and $\alpha$ are the regularization parameters.

Figure 3:
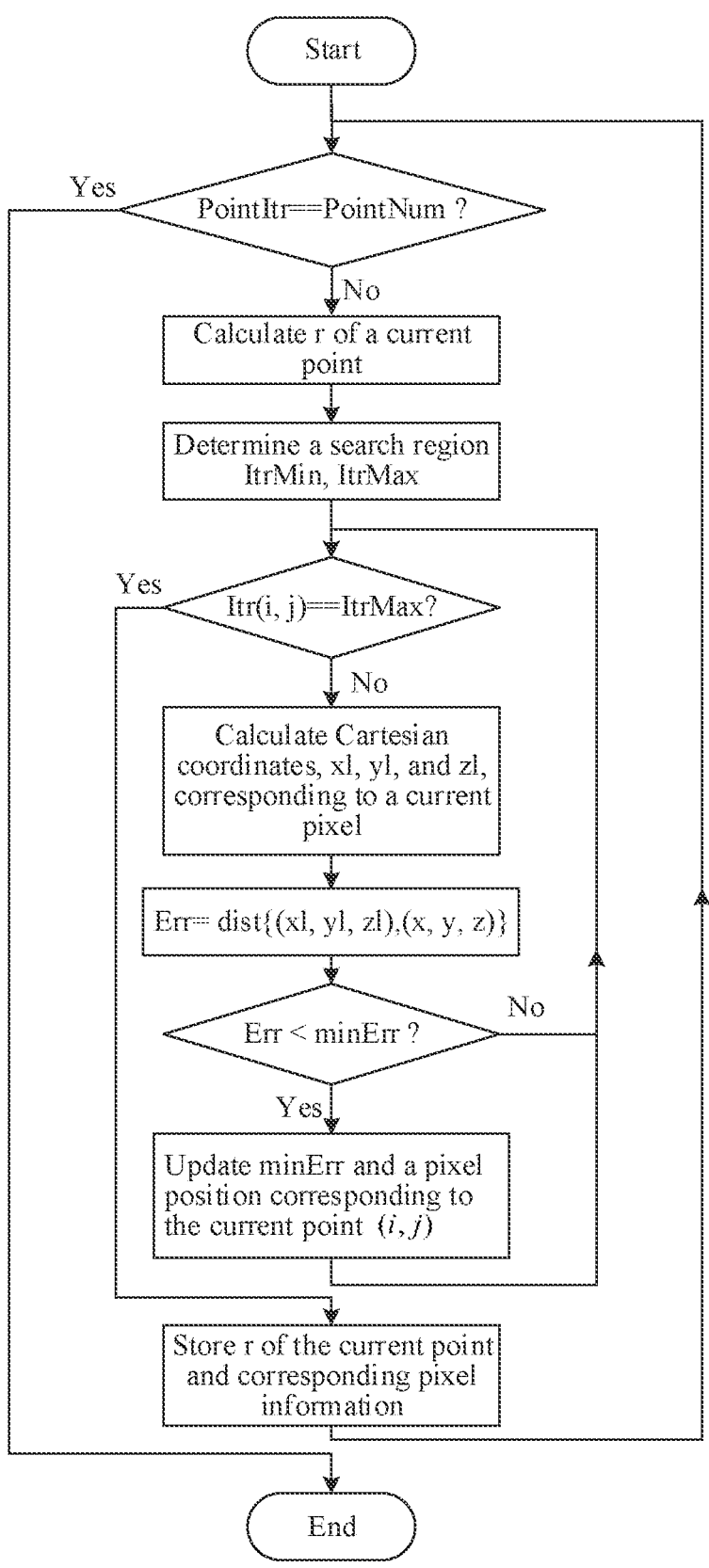
FIG. 3 is a flowchart of determining a mapping relationship between an original point cloud and a two-dimensional projection plane structure according to an embodiment of the present disclosure.

In another embodiment of the present disclosure, another method for determining the mapping relationship between the original point cloud data and the two-dimensional projection plane structure is provided. Referring to FIG. 3, FIG. 3 is a flowchart of determining a mapping relationship between an original point cloud and a two-dimensional projection plane structure according to an embodiment of the present disclosure, including:

31) Determine a cylindrical coordinate component of a current point in the original point cloud data.

Specifically, calculation of the cylindrical coordinate component r of the current point (x, y, z) is as follows, and r represents a radial distance between the current point and a coordinate origin:

$$r = \sqrt{x^2 + y^2}\ .$$

32) Determine a search region of the current point in the two-dimensional projection plane structure.

In this embodiment, the search region may include one pixel in the two-dimensional projection plane structure, or may include a plurality of pixels in the two-dimensional projection plane structure.

The whole two-dimensional projection plane structure may be directly selected as the search region. Further, to reduce a computing amount, a search region of a corresponding pixel in the two-dimensional projection plane structure may be determined through a pitch angle $\theta$ and an azimuth $\phi$ of the cylindrical coordinate component of the current point, to reduce the search region.

In another embodiment of the present disclosure, a candidate corresponding position of the current point in the two-dimensional projection plane structure may be determined through the regularization parameters and the foregoing calibration formulas, and the search region may be determined with reference to the candidate corresponding position. In addition, the search region of the current point may also be determined according to a-priori information.

32) Traverse pixels in the search region, calculate a position of a current pixel in a Cartesian coordinate system, and calculate a spatial distance between the position and the current point.

After the search region is determined, for each pixel (i, j) in the search region, by using the regularization parameters, that is, a-priori calibration parameters: $\theta_0$, $V_o$ $H_o$, and $\alpha$, of a $i^{th}$ laser scanner of the lidar, the position (xl, yl, zl) of the current pixel in the Cartesian coordinate system is calculated, and specific calculation formulas are as follows:

$$\theta_i = \theta_0$$

$$\phi_j = -180° + j \times \Delta\varphi$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

After the position (xl, yl, zl) of the current pixel in the Cartesian coordinate system is obtained, the spatial distance between the position and current point (x, y, z) is calculated and regarded as an error Err, that is:

$$Err = dist\{(x, y, z), (xl, yl, zl)\}$$

33) Select a pixel with the shortest spatial distance as a corresponding pixel of the current point in the two-dimensional projection plane structure.

Specifically, if the error Err is greater than a minimum error m/nErr, skip the foregoing update process. If the error Err is less than the current minimum error m/nErr, the error Err is used to update the minimum error m/nErr, and z and that correspond to the current pixel are used to update z and of the corresponding pixel of the current point; and if the error Err is greater than the minimum error m/nErr, skip the foregoing update process.

After all pixels in the search region are traversed, the corresponding pixel (i, j) of the current point in the two-dimensional projection plane structure and the cylindrical coordinate component r of the current point may be determined.

34) Repeat the foregoing steps until corresponding pixels in the two-dimensional projection plane structure are found for all points in the original point cloud data.

Figure 4:
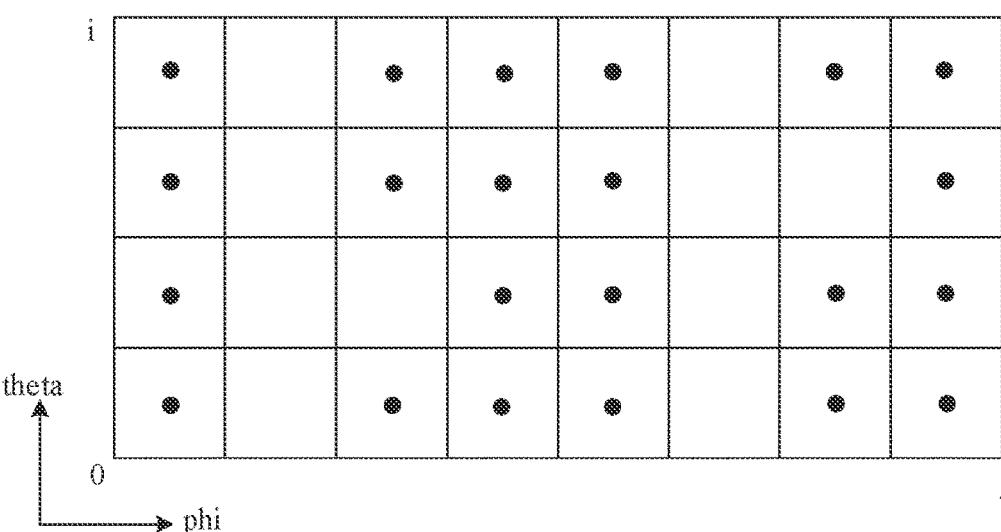
FIG. 4 is a schematic diagram of a two-dimensional projection plane structure of a point cloud according to an embodiment of the present disclosure.

After all points in the original point cloud complete the foregoing operations, the two-dimensional regularized planar projection of the point cloud is completed. Specifically, referring to FIG. 4, FIG. 4 is a schematic diagram of a two-dimensional projection plane structure of a point cloud according to an embodiment of the present disclosure, where all points in the original point cloud data are mapped onto corresponding pixels in the structure.

It should be noted that, during the two-dimensional regularized planar projection of the point cloud, a plurality of points in the point cloud may correspond to a same pixel in the two-dimensional projection plane structure. To avoid this situation, it may be selected to project these space points onto different pixels during projection. For example, when a point is projected, if there is already a corresponding point in a pixel corresponding to the point, the point is projected to an empty pixel adjacent to the pixel. In addition, if a plurality of points in the point cloud are already projected onto a same pixel in the two-dimensional projection plane structure, when encoding is performed based on the two-dimensional projection plane structure, a number of corresponding points in each pixel should be additionally encoded, and information of each corresponding point in the pixel should be encoded according to the number of corresponding points.

In the present disclosure, by projecting a point cloud in a three-dimensional space onto a corresponding two-dimensional regularized projection plane structure, regularized correction is performed on the point cloud in a vertical direction and a horizontal direction, and a strong correlation representation of the point cloud on the two-dimensional projection plane structure is obtained, thereby avoiding sparsity existing in a three-dimensional representation structure, and better reflecting a spatial correlation of the point cloud, providing a form of expression that is easier for processing data for an application of the point cloud.

Embodiment 2

Figure 5:
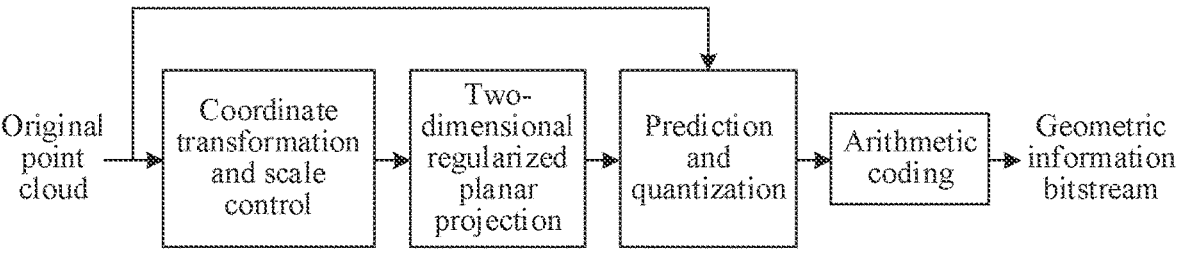
FIG. 5 is a block diagram of large-scale point cloud-oriented encoding according to an embodiment of the present disclosure.

Based on the foregoing embodiment 1, this embodiment provides a large-scale point cloud-oriented encoding method. Referring to FIG. 5, FIG. 5 is a block diagram of a large-scale point cloud-oriented encoding according to an embodiment of the present disclosure, including:

Step 1. Obtain original point cloud data and perform a two-dimensional regularized planar projection to obtain a two-dimensional regularized projection plane structure of a point cloud.

Specifically, this embodiment uses the two-dimensional regularized planar projection in the foregoing embodiment 1 to process an original point cloud to obtain the two-dimensional regularized projection plane structure of the point cloud.

In addition, preprocessing, such as coordinate transformation, scale control, or voxelization, may be first performed on the original point cloud, and then the two-dimensional regularized planar projection may be performed.

Step 2. Predict based on the two-dimensional regularized projection plane structure of the point cloud to obtain to-be-encoded data.

Generally, when prediction encoding is performed on large-scale point cloud data, information of the large-scale point cloud data, such as a radial distance r, a pitch angle information i, an azimuth interval n, azimuth residual information $\Delta\varphi$, residuals ($\Delta x$, $\Delta y$, $\Delta z$) between each point and a corresponding original point in a Cartesian coordinate system after the coordinate transformation of the point cloud, repeat point information, or a quantization parameter, needs to be encoded specifically.

In this embodiment, when the prediction encoding is performed based on the two-dimensional regularized projection plane structure of the point cloud, information such as a position i and a position j (alternatively, i is position information in a pitch angle direction, and j is position information in an azimuth direction) of each non-empty pixel in the two-dimensional regularized projection plane structure, a radial distance r of a corresponding point, residuals ($\Delta x$, $\Delta y$, $\Delta z$) between a space point obtained through inverse projection of a pixel and a corresponding point in the Cartesian coordinate system, the repeat point information, or the quantization parameter, needs to be encoded specifically. It should be noted that, a residual, referred to as a projection residual, may exist between a corresponding position of a non-empty pixel in the two-dimensional regularized projection plane structure and an actual projection position of a corresponding point of the non-empty pixel. During actual encoding, the projection residual may also be encoded.

The two-dimensional regularized projection plane structure of the point cloud is obtained after step 1. The plane structure presents a feature of even distribution, and an advantage of the structure cannot be highlighted if a traditional prediction tree encoding is used.

Based on this, this embodiment provides a more flexible method: setting different prediction modes for different data according to the two-dimensional regularized projection plane structure of the point cloud and predicting geometric information of a current point according to a corresponding prediction mode to obtain the to-be-encoded data, thereby improving effectiveness of the prediction and reducing a residual generated in the prediction. As detailed below:

1. For the Position Information in the Azimuth Direction:

In this embodiment, a position parameter j in the azimuth direction represents interval information along the azimuth direction with a minimum sampling interval as a unit. Because the two-dimensional regularized projection plane structure of the point cloud also presents regularized distribution in the azimuth direction, compared to uneven distribution that an interval between a current to-be-compressed point in traditional G-PCC prediction tree encoding and a reference point is n, the position j in the azimuth direction in this embodiment is evenly distributed. Therefore, j of a current position may be predicted through a j component of a same position on a previous row.

More specifically, if a position of a corresponding pixel of the current to-be-compressed point in the two-dimensional regularized projection plane structure is (i, j) and a position (i, j−1) is not empty, a to-be-compressed j component may be obtained by subtracting a j component of a $(j−1)^{th}$ row position from j of the current point; and if the position (i, j−1) is empty, the to-be-compressed j component can directly use a j component of the current point.

Compared to a traditional G-PCC method, compression of the j component is performed with reference to information of a same column in the two-dimensional regularized projection plane structure, which effectively reduces a value, thereby reducing bitstream overheads.

2. For a Residual in an Azimuth Direction Phi:

The two-dimensional regularized planar projection of the point cloud is corrected at two dimensions including the pitch angle and the azimuth; the two-dimensional regularized projection plane structure of the point cloud also presents the feature of even distribution in the azimuth direction. Therefore, an error in the azimuth is very small, and there is no need to compress the residual in the azimuth direction phi, so there is no need to perform residual calculation.

3. For the Position Information in the Pitch Angle Direction:

Prediction may be performed according to the method in the traditional G-PCC prediction tree, and a specific process is not described herein again.

4. For the Radial Distance r:

Because prediction in this embodiment is performed based on the two-dimensional regularized projection plane structure of the point cloud, and the two-dimensional regularized projection plane structure presents the regularized distribution both at the two dimensions: the pitch angle and the azimuth, the prediction may be performed according to a direction.

Specifically, three prediction modes in total as follows may be constructed according to a left direction and an upper direction:

Mode 0: A direct mode, compress directly without prediction;

Mode 1: Predict left and use a corresponding point of a pixel on the left side as a reference point; and Mode 2: Predict upward and use a corresponding point of a pixel above as a reference point.

Figure 6:
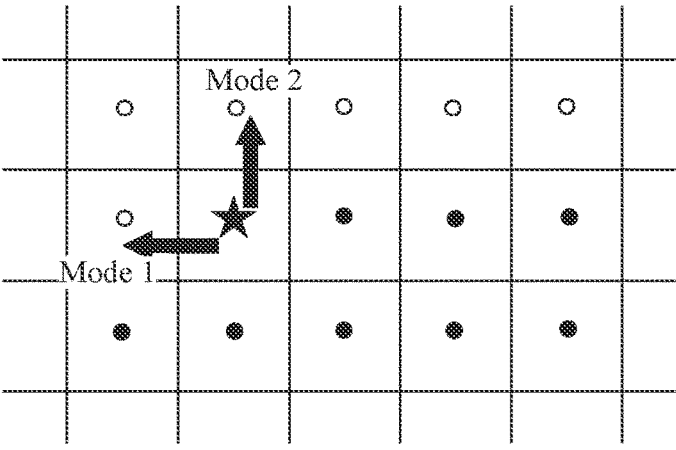
FIG. 6 is a schematic structural diagram of three prediction modes according to an embodiment of the present disclosure.

Specifically, referring to FIG. 6, FIG. 6 is a schematic structural diagram of three prediction modes according to an embodiment of the present disclosure, where a "●" point represents a point that has been encoded, "○" red represents a point that hasn't been encoded, and "★" represents a current to-be-encoded position, which may perform prediction along an azimuth (Mode 1) direction and a pitch angle (Mode 2) direction based on a radial distance residual Δr and select a point with a smaller Δr as the reference point.

The two-dimensional regularized projection plane structure of the point cloud is traversed by using an order from top to bottom and an order from left to right. Whether a corresponding point of a current pixel is a first point to be traversed is determined first during traversing. If yes, a current point is set as a first node and prediction is not performed, Mode 0 is selected, and a radial distance r of the point is directly regarded as the to-be-encoded data; or if no, prediction is performed according to prediction manners set in Mode 1 and Mode 2, $Δr_s$ obtained through Mode 1 and Mode 2 are compared, a mode with smaller Δr is selected as a prediction mode of the current point, and the current Δr is regarded as the to-be-encoded data.

The foregoing process is repeated until corresponding points of all pixels in the two-dimensional regularized projection plane structure, that is, all points in the point cloud, have completed the prediction.

In addition, in another embodiment of the present disclosure, five prediction modes in total as follows may be constructed according to a left direction, an upper direction, an upper left direction, and an upper right direction:

Mode 0: A direct mode, compress directly without prediction;

Mode 1: Predict left and use a corresponding point of a pixel on the left side as a reference point;

Mode 2: Predict upward and use a corresponding point of a pixel above as a reference point;

Mode 3: Predict upper left and use a corresponding point of an upper left pixel as a reference point; and Mode 4: Predict upper right and use a corresponding point of an upper right pixel as a reference point.

Figure 7:
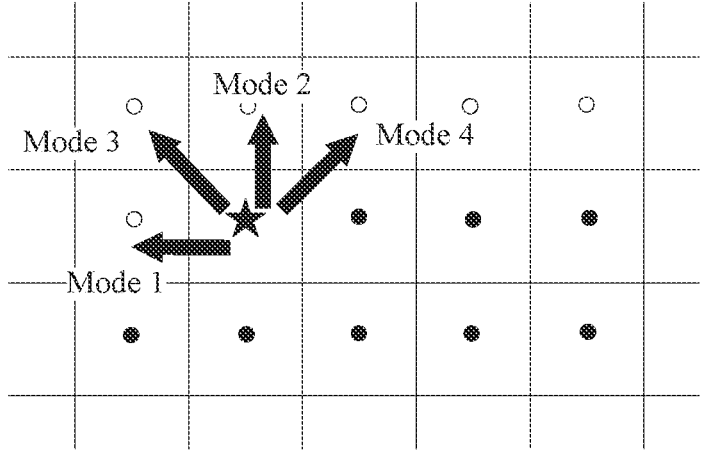
FIG. 7 is a schematic structural diagram of five prediction modes according to an embodiment of the present disclosure.

Specifically, referring to FIG. 7, FIG. 7 is a schematic structural diagram of five prediction modes according to an embodiment of the present disclosure, where a "●" point represents a point that has been encoded, "○" represents a point that hasn't been encoded, and "★" represents a current to-be-encoded position, which may perform prediction along an azimuth (Mode 1) direction and a pitch angle (Mode 2) direction based on a radial distance residual Δr and select a point with a smaller Δr as the reference point.

5. For Residuals of x, y, and z:

To reduce a number of repetition of an encoding end, a calculation process of the residuals (Δx, Δy, Δz) can be placed in the foregoing prediction process for calculating the residual of the radial distance r. Inverse projection is performed on a pixel in the two-dimensional regularized projection plane structure first by using the previous calibration formulas herein, and during the inverse projection, a radial distance r of a corresponding point of the pixel and a corresponding pitch angle and a corresponding azimuth of the pixel need to be combined, and then the residuals (Δx, Δy, Δz) between a spatial position obtained through the inverse projection and the original point cloud is calculated.

In this embodiment, because regularization parameters at two dimensions including the pitch angle and the azimuth are used during performing the two-dimensional regularized planar projection on the point cloud, a corresponding residual value is less than a value obtained through the traditional G-PCC method, which further reduces the bit-stream and improves the encoding efficiency to a certain extent.

Step 3. Divide the to-be-encoded data into a first type of to-be-encoded data and a second type of to-be-encoded data, where the first type of to-be-encoded data is two-dimensional regularized projection plane structure data, and the second type of to-be-encoded data is remaining to-be-encoded data other than the two-dimensional regularized projection plane structure data.

Because the two-dimensional regularized projection plane structure of the point cloud is the most direct carrier for geometric information of the original point cloud and has a relatively large data amount, in this embodiment, the to-be-encoded data obtained in the last step is divided into two types according to a feature of the two-dimensional regularized projection plane structure of the point cloud, where the first type of to-be-encoded data is the two-dimensional regularized projection plane structure data of the point cloud, including the radial distance r, the position information i in the pitch angle direction, and the position information j in the azimuth direction. The second type of to-be-encoded data is the remaining to-be-encoded data other than the two-dimensional regularized projection plane structure data, including information such as residuals ($\Delta x$, $\Delta y$, $\Delta z$) between each point after the two-dimensional regularized planar projection of the point cloud and the original point cloud in the Cartesian coordinate system, the repeat point information, or the quantization parameter.

Step 4. Encode different data in the first type of to-be-encoded data separately in a preset encoding manner, and simultaneously encode the second type of to-be-encoded data, to obtain a geometric information bit-stream.

Specifically, according to an analysis in step 2, the residual in the azimuth direction phi in the first type of to-be-encoded data is not encoded, and other information in the first type of to-be-encoded data is encoded in an arithmetic coding manner, and the second type of to-be-encoded data is encoded, to obtain the geometric information bit-stream and complete the large-scale point cloud-oriented encoding.

In addition, it should be noted that, in the large-scale point cloud-oriented encoding method provided in the present disclosure, the two-dimensional regularized planar projection is performed on a point cloud in a three-dimensional space, and a two-dimensional regularized projection plane structure corresponding to the point cloud is obtained, and then prediction encoding is performed based on the structure. Because the two-dimensional regularized projection plane structure of the point cloud can visualize information of the point cloud, the point cloud after the two-dimensional regularized planar projection may further be compressed in a picture/video compression manner, for example, JPEG, JPEG2000, HE/F, H. 264\AVC, H.265\HEVC, or the like.

To further describe the beneficial effects of the present disclosure, in this embodiment, by using the most common KITTI data in the point cloud field as test data, lossless point cloud encoding efficiency of the method provided in the present disclosure and that of a traditional MPEG G-PCC method under four scenarios including a campus (kitti_campus), a residential area (kitti_residential), a city (kitti_city), and a road (kitti road) are tested, and a result is as shown in the following table:

TABLE 1

| | Encoding Efficiency | | |
| --- | --- | --- | --- |
| Sequence | MPEG G-PCC v11(bits) | The proposal (bits) | The proposal Encoding efficiency |
| kitti_residential | 8579480 | 7797816 | 9.11% |
| kitti_campus | 7488928 | 6869968 | 8.27% |
| kitti_city | 7071608 | 6738152 | 4.72% |
| kitti_road | 8006488 | 7573736 | 5.41% |
| Overall average | | | 5.51% |

It may be learned from the table that the method provided in the present disclosure has better performance improvement, and an overall increase may be 5.51%, where a gain of more than 8% may be obtained for a scene with fewer pedestrians such as a campus or a residential area.

Embodiment 3

Figure 8:
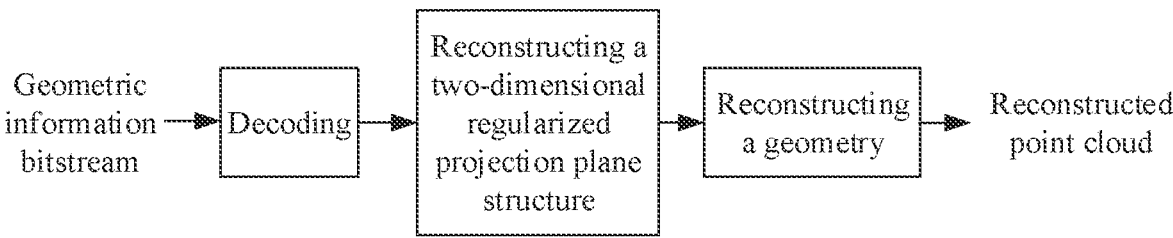
FIG. 8 is a block diagram of large-scale point cloud-oriented decoding according to an embodiment of the present disclosure.

Based on the foregoing embodiment 2, this embodiment provides a large-scale point cloud-oriented decoding method. Referring to FIG. 8, FIG. 8 is a block diagram of a large-scale point cloud-oriented decoding according to an embodiment of the present disclosure, including:

S1. Obtain a geometric information bitstream.

S2. Decode the geometric information bitstream to obtain parsed data.

Specifically, first, a first type of to-be-encoded data and a second type of to-be-encoded data may be obtained by decoding the geometric information bitstream, where the first type of to-be-encoded data is two-dimensional regularized projection plane structure data of a point cloud, including a radial distance r, position information i in a pitch angle direction, and position information j in an azimuth direction. The second type of to-be-encoded data is remaining to-be-encoded data other than the two-dimensional regularized projection plane structure data, including information such as residuals ($\Delta x$, $\Delta y$, $\Delta z$) between each point after the two-dimensional regularized planar projection of the point cloud and an original point cloud in a Cartesian coordinate system, repeat point information, or a quantization parameter.

S3. Reconstruct a two-dimensional regularized projection plane structure according to the parsed data.

Specifically, because the parsed data includes a radial distance r, position information i in a pitch angle direction, and position information j in an azimuth direction of a point, a corresponding pixel of the point in the two-dimensional regularized projection plane structure, that is, a pixel of an $i^{th}$ row and a $j^{th}$ column in the two-dimensional regularized projection plane structure, may be determined through i and j. In addition, a radial distance r of a corresponding point of the pixel may be known through r. Therefore, a reconstructed two-dimensional projection plane structure is obtained.

S4: Perform geometric reconstruction according to the reconstructed two-dimensional regularized projection plane structure to obtain a reconstructed point cloud.

For each pixel in the reconstructed two-dimensional regularized projection plane structure, if a current pixel is non-empty, a space point (x, y, z) corresponding to the current pixel may be reconstructed in a following manner according to a radial distance r of a corresponding point of the current pixel (i, j) and parsed residuals ($\Delta x$, $\Delta y$, $\Delta z$).

A corresponding position of the current pixel (i, j) may be represented as ($\phi_j$, i) where

15

$$\phi_j = -180° + j \times \Delta\varphi$$

The following uses regularization parameters and following formulas to inversely project the current pixel onto the Cartesian coordinate system, to obtain corresponding Cartesian coordinates (xl, yl, zl).

$$\theta_j = \theta_0$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

Finally, the space point (x, y, z) corresponding to the current pixel is reconstructed by using following formulas according to a spatial position (xl, yl, zl) obtained through inverse projection of the current pixel and the residuals ($\Delta x$, $\Delta y$, $\Delta z$).

$$x = xl + \Delta x$$

$$y = yl + \Delta y$$

$$z = zl + \Delta z$$

According to the calculation above, a space point corresponding to each non-empty pixel in the reconstructed two-dimensional regularized projection plane structure may be reconstructed, and thereby the reconstructed point cloud may be obtained.

The foregoing content further describes the present disclosure in detail with reference to specific exemplary embodiments, and the specification should not be construed as a limitation on the specific embodiments of the present disclosure. A person of ordinary skill in the art can further make simple deductions or replacements without departing from the concept of the present disclosure, and such deductions or replacements should all be considered as falling within the protection scope of the present disclosure.

What is claimed is:

1. A large-scale point cloud-oriented two-dimensional regularized planar projection method, comprising:
   obtaining original point cloud data;
   initializing a two-dimensional projection plane structure of a point cloud by using regularization parameters; and
   determining a mapping relationship between the original point cloud data and the two-dimensional projection plane structure to obtain a two-dimensional regularized projection plane structure of the point cloud;
   wherein the initializing the two-dimensional projection plane structure of the point cloud by using the regularization parameters comprises:
   initializing the two-dimensional projection plane structure of the point cloud based on a number of laser scanners and one of (i) a sampling angular resolution $\Delta\varphi$ in a horizontal azimuth, or (ii) a number of sampling points of a laser scanner in the regularization parameters, that is, $$M = laserNum; \text{ and}$$

16

-continued $$N = \frac{360°}{\Delta\varphi} \text{ or } N = pointNumPerLaser,$$

wherein M and N respectively represent a resolution in a vertical direction and a resolution in a horizontal direction in the two-dimensional projection plane structure, laserNum represents the number of laser scanners, $\Delta\varphi$ represents the sampling angular resolution of the laser scanner in the horizontal azimuth, and pointNumPerLaser represents the number of sampling points of the laser scanner.

2. The large-scale point cloud-oriented two-dimensional regularized planar projection method according to claim 1, wherein the regularization parameters comprise a calibration parameter of a lidar.

3. The large-scale point cloud-oriented two-dimensional regularized planar projection method according to claim 1, wherein the determining the mapping relationship between the original point cloud data and the two-dimensional projection plane structure comprises:
   seeking a solution through the regularization parameters and calibration formulas to obtain a corresponding position of a point in the original point cloud data in the two-dimensional projection plane structure through calculation to determine the mapping relationship between the original point cloud data and the two-dimensional projection plane structure, wherein the calibration formulas are represented as:

$$r = \sqrt{x^2 + y^2};$$

$$i = \arg\min_{i=1 \dots laserNum} |z - V_o - r \times \tan\theta_o|$$

$$\theta_i = \theta_0;$$

$$x = r \cdot \sin(\phi_j - \alpha) - H_o \cdot \cos(\phi_j - \alpha);$$

$$y = r \cdot \cos(\phi_j - \alpha) + H_o \cdot \sin(\phi_j - \alpha);$$

$$z = r \cdot \tan\theta_i + V_o; \text{ and}$$

$$j = (\phi_j + 180°)/\Delta\varphi,$$

wherein (x, y, z) represents Cartesian coordinates of the point in the original point cloud data, r is a cylindrical coordinate component of the point representing a distance between the point and a coordinate origin of a lidar, $\theta_i$ and $\phi_j$ are a pitch angle and an azimuth of a corresponding pixel of the point in the two-dimensional projection plane structure, (i, j) represents a position of the corresponding pixel of the point in the two-dimensional projection plane structure, and $\theta_0$, $V_o$, $H_o$, and $\alpha$ are the regularization parameters.

4. The large-scale point cloud-oriented two-dimensional regularized planar projection method according to claim 1, wherein the determining the mapping relationship between the original point cloud data and the two-dimensional projection plane structure further comprises:
   determining a cylindrical coordinate component of a current point in the original point cloud data;
   determining a search region of the current point in the two-dimensional projection plane structure;
   traversing pixels in the search region, calculating a position of a current pixel in a Cartesian coordinate system, and calculating a spatial distance between the position and the current point;

selecting a pixel with a shortest spatial distance as a corresponding pixel of the current point in the two-dimensional projection plane structure; and repeating the foregoing steps until corresponding pixels in the two-dimensional projection plane structure are found for each point in the original point cloud data.

5. The large-scale point cloud-oriented two-dimensional regularized planar projection method according to claim 4, wherein the determining the search region of the current point in the two-dimensional projection plane structure comprises one of:

(i) determining the search region of the current point in the two-dimensional projection plane structure through a pitch angle $\theta$ and an azimuth $\phi$ of the current point in a cylindrical coordinate system; or (ii) determining the search region of the current point in the two-dimensional projection plane structure through the regularization parameters and calibration formulas; or (iii) determining the search region of the current point according to a-priori information.

6. The large-scale point cloud-oriented two-dimensional regularized planar projection method according to claim 4, wherein calculation formulas for the position of the current pixel in the Cartesian coordinate system are:

$$\theta_i = \theta_0;$$

$$\phi_j = -180° + j \times \Delta\varphi;$$

$$r = \sqrt{x^2 + y^2};$$

$$xl = r \cdot \sin(\phi_j - \alpha) - H_o \cdot \cos(\phi_j - \alpha);$$

$$yl = r \cdot \cos(\phi_j - \alpha) + H_o \cdot \sin(\phi_j - \alpha); \text{ and}$$

$$zl = r \cdot \tan\theta_i + V_o,$$

wherein (i, j) represents a position of the current pixel in the two-dimensional projection plane structure, a pitch angle and an azimuth that correspond to the current pixel are $\theta_i$ and $\phi_j$, x and y are Cartesian coordinate components of the current point in the original point cloud data, r is a cylindrical coordinate component of the current point in the original point cloud data, (xl, yl, zl) represents the position of the current pixel in the Cartesian coordinate system, and $\theta_0$, $V_o$, $H_o$ and $\alpha$ are the regularization parameters.

7. The large-scale point cloud-oriented two-dimensional regularized planar projection method according to claim 1, wherein the regularization parameters comprise a parameter obtained through optimized estimation or data fitting.

8. A large-scale point cloud-oriented encoding method, comprising:

obtaining original point cloud data;

initializing a two-dimensional projection plane structure of a point cloud by using regularization parameters, wherein the initializing the two-dimensional projection plane structure of the point cloud by using the regularization parameters comprises:

initializing the two-dimensional projection plane structure of the point cloud based on a number of laser scanners and one of (i) a sampling angular resolution $\Delta\varphi$ in a horizontal azimuth, or (ii) a number of sampling points of a laser scanner in the regularization parameters, that is, $$M = laserNum; \text{ and}$$

$$N = \frac{360°}{\Delta\varphi} \text{ or } N = pointNumPerLaser,$$

wherein M and N respectively represent a resolution in a vertical direction and a resolution in a horizontal direction in the two-dimensional projection plane structure, laserNum represents the number of laser scanners, $\Delta\varphi$ represents the sampling angular resolution of the laser scanner in the horizontal azimuth, and pointNumPerLaser represents the number of sampling points of the laser scanner;

obtaining a two-dimensional regularized projection plane structure of a point cloud based on a mapping relationship between the original point cloud data and the two-dimensional projection plane structure;

predicting, based on the two-dimensional regularized projection plane structure of the point cloud, to-be-encoded data;

dividing the to-be-encoded data into a first type of to-be-encoded data and a second type of to-be-encoded data, wherein the first type of to-be-encoded data is two-dimensional regularized projection plane structure data, and the second type of to-be-encoded data is remaining to-be-encoded data other than the two-dimensional regularized projection plane structure data; and encoding different data in the first type of to-be-encoded data separately in a preset encoding manner, and encoding the second type of to-be-encoded data, to obtain a geometric information bitstream.

9. The large-scale point cloud-oriented encoding method according to claim 8, wherein the predicting the to-be-encoded data comprises:

setting different prediction modes for different data according to the two-dimensional regularized projection plane structure of the point cloud; and predicting, according to a corresponding prediction mode, to obtain the to-be-encoded data.

10. An electronic device, comprising:

a memory configured to store computer-executable instructions; and a processor configured to execute the computer-executable instructions to cause the electronic device to:

obtain original point cloud data;

initialize a two-dimensional projection plane structure of a point cloud by using regularization parameters; and determine a mapping relationship between the original point cloud data and the two-dimensional projection plane structure to obtain a two-dimensional regularized projection plane structure of the point cloud;

wherein the initializing the two-dimensional projection plane structure of the point cloud by using the regularization parameters comprises:

initializing the two-dimensional projection plane structure of the point cloud based on a number of laser scanners and one of (i) a sampling angular resolution $\Delta\varphi$ in a horizontal azimuth, or (ii) a number of sampling points of a laser scanner in the regularization parameters, that is, $$M = laserNum; \text{ and}$$

-continued $$N = \frac{360°}{\Delta\varphi} \text{ or } N = pointNumPerLaser,$$

wherein M and N respectively represent a resolution in a vertical direction and a resolution in a horizontal direction in the two-dimensional projection plane structure, laserNum represents the number of laser scanners, $\Delta\varphi$ represents the sampling angular resolution of the laser scanner in the horizontal azimuth, and pointNumPerLaser represents the number of sampling points of the laser scanner.

11. The electronic device according to claim 10, wherein the regularization parameters comprise a calibration parameter of a lidar.

12. The electronic device according to claim 10, wherein the regularization parameters comprise a parameter obtained through optimized estimation or data fitting.

13. The electronic device according to claim 10, wherein the determining the mapping relationship between the original point cloud data and the two-dimensional projection plane structure comprises:

seeking a solution through the regularization parameters and calibration formulas to obtain a corresponding position of a point in the original point cloud data in the two-dimensional projection plane structure through calculation to determine the mapping relationship between the original point cloud data and the two-dimensional projection plane structure, wherein the calibration formulas are represented as:

$$r = \sqrt{x^2 + y^2};$$

$$i = \arg\min_{i=1\,...\,laserNum} |z - V_o - r \times \tan\theta_o|$$

$$\theta_i = \theta_0;$$

$$x = r \cdot \sin(\phi_j - \alpha) - H_o \cdot \cos(\phi_j - \alpha);$$

$$y = r \cdot \cos(\phi_j - \alpha) + H_o \cdot \sin(\phi_j - \alpha);$$

$$z = r \cdot \tan\theta_i + V_o; \text{ and}$$

$$j = (\phi_j + 180°)/\Delta\varphi,$$

wherein (x, y, z) represents Cartesian coordinates of the point in the original point cloud data, r is a cylindrical coordinate component of the point representing a distance between the point and a coordinate origin of a lidar, $\theta_i$ and $\phi_j$ are a pitch angle and an azimuth of a corresponding pixel of the point in the two-dimensional projection plane structure, (i, j) represents a position of the corresponding pixel of the point in the two-dimensional projection plane structure, and $\theta_0$, $V_o$, $H_o$, and $\alpha$ are the regularization parameters.

14. The electronic device according to claim 10, wherein the determining the mapping relationship between the original point cloud data and the two-dimensional projection plane structure further comprises:

determining a cylindrical coordinate component of a current point in the original point cloud data;

determining a search region of the current point in the two-dimensional projection plane structure;

traversing pixels in the search region, calculating a position of a current pixel in a Cartesian coordinate system, and calculating a spatial distance between the position and the current point;

selecting a pixel with a shortest spatial distance as a corresponding pixel of the current point in the two-dimensional projection plane structure; and repeating the foregoing steps until corresponding pixels in the two-dimensional projection plane structure are found for each point in the original point cloud data.

15. The electronic device according to claim 14, wherein the determining the search region of the current point in the two-dimensional projection plane structure comprises one of:

(i) determining the search region of the current point in the two-dimensional projection plane structure through a pitch angle $\theta$ and an azimuth $\phi$ of the current point in a cylindrical coordinate system; or (ii) determining the search region of the current point in the two-dimensional projection plane structure through the regularization parameters and calibration formulas; or (iii) determining the search region of the current point according to a-priori information.

16. The electronic device according to claim 14, wherein calculation formulas for the position of the current pixel in the Cartesian coordinate system are:

$$\theta_i = \theta_0;$$

$$\phi_j = -180° + j \times \Delta\varphi;$$

$$r = \sqrt{x^2 + y^2};$$

$$xl = r \cdot \sin(\phi_j - \alpha) - H_o \cdot \cos(\phi_j - \alpha);$$

$$yl = r \cdot \cos(\phi_j - \alpha) + H_o \cdot \sin(\phi_j - \alpha); \text{ and}$$

$$zl = r \cdot \tan\theta_i + V_o,$$

wherein (i, j) represents a position of the current pixel in the two-dimensional projection plane structure, a pitch angle and an azimuth that correspond to the current pixel are $\theta_i$ and $\phi_j$, x and y are Cartesian coordinate components of the current point in the original point cloud data, r is a cylindrical coordinate component of the current point in the original point cloud data, (xl, yl, zl) represents the position of the current pixel in the Cartesian coordinate system, and $\theta_0$, $V_o$, $H_o$ and $\alpha$ are the regularization parameters.

* * * * *